United States Patent [19]
Hon et al.

[11] Patent Number: 5,761,687
[45] Date of Patent: Jun. 2, 1998

[54] CHARACTER-BASED CORRECTION ARRANGEMENT WITH CORRECTION PROPAGATION

[75] Inventors: Hsiao-Wuen Hon, Woodinville, Wash.; Gerald T. Beauregard, Ottawa, Canada; Eric A. Hulteen, Menlo Park, Calif.

[73] Assignee: Apple Computer, Inc., Cupertino, Calif.

[21] Appl. No.: 539,342

[22] Filed: Oct. 5, 1995

[51] Int. Cl.⁶ ................................... G06F 17/21
[52] U.S. Cl. ................. 707/531; 707/533; 704/246
[58] Field of Search ..................... 395/2.49, 2.53, 395/2.62–2.66, 2.55, 759; 704/9, 240, 244, 246, 251, 257; 707/533, 535, 531

[56] References Cited

U.S. PATENT DOCUMENTS

| | | |
|---|---|---|
| 4,718,094 | 1/1988 | Bahl et al. |
| 4,827,521 | 5/1989 | Bahl et al. |
| 5,027,406 | 6/1991 | Roberts et al. |
| 5,384,892 | 1/1995 | Strong |
| 5,386,494 | 1/1995 | White |

OTHER PUBLICATIONS

"MicroSoft Word, Getting Started" © 1992 pp. 30–32.
"Matrix Fast Search . . . " by Bahl et al., Publ. 1989 Acc. 02848866 file 8.
"Speaker—Independent Large Vocabulary Spoken Word . . . " by Sawai, Publ. yr. 1989 vol. 20 n 12 Acc. 02952513 file 8.

*Primary Examiner*—Robert A. Weinhardt
*Attorney, Agent, or Firm*—Blakely, Sokoloff, Taylor & Zafman

[57] ABSTRACT

A method of correcting a text in a data processing system is described. The method includes the step of locating a first incorrect character in the text. A character list of alternative characters for the first incorrect character is then shown to the user who replaces the first incorrect character with a correct character from the character list. The change of the first incorrect character is then propagated through a remainder of the text in accordance with a matching score and a language probability score of the remainder of the text with respect to the correct character to correct any subsequent incorrect character in the text.

27 Claims, 7 Drawing Sheets

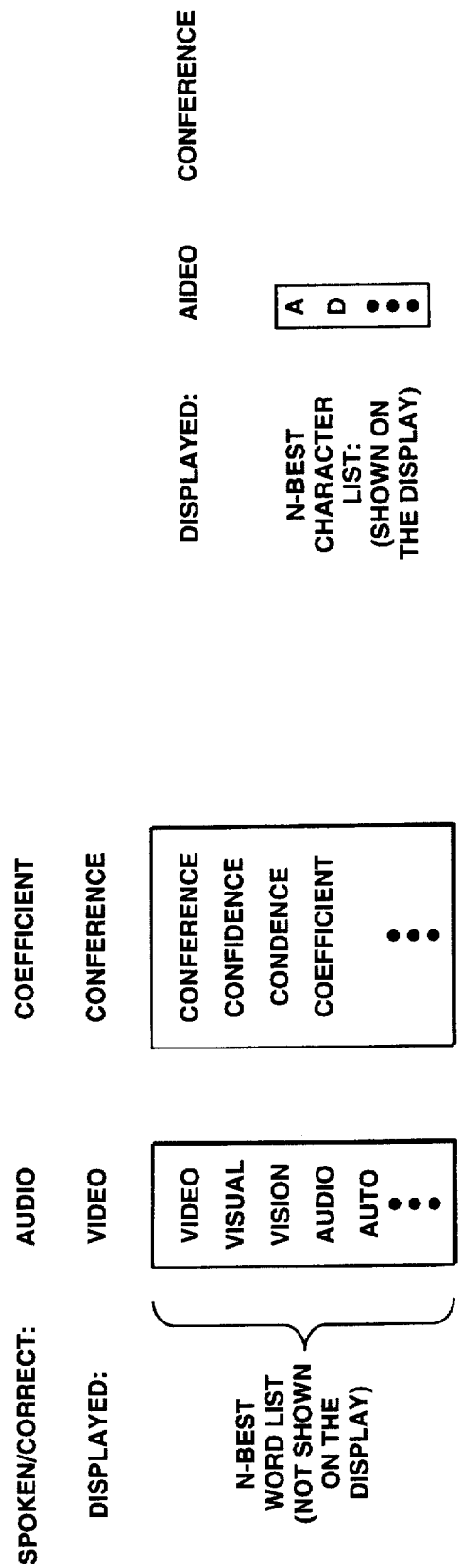

CHARACTER-BASED CORRECTION ARRANGEMENT WITH CORRECTION PROPAGATION

FIELD OF THE INVENTION

The present invention pertains to the field of user input processing and correction. More particularly, this invention relates to a character-based correction arrangement for a user input recognition system with correction propagation.

BACKGROUND OF THE INVENTION

Inputting a Chinese character by means of keyboard is difficult, time-consuming, and typically requiring extensive training in input methods. This is due to the fact that the Chinese language is a pictographic language and has more than several thousand different characters. Since one use of speech recognition is to enter large amounts of text into a computer system efficiently, it is advantageous to input Chinese text using speech recognition.

Speech recognition systems inevitably make recognition errors. Hence, it is necessary to employ a correction system in the speech recognition systems. In this case, the computer system typically displays a list of alternative words in the vocabulary (e.g., an active lexicon) that best match what the user spoke. The correction schemes in prior art dictation systems (or programs) are typically tailored for word-based languages (i.e., English and French). While the words in Western languages are clearly defined by blank spaces between those words, the concept of a "word" for the Chinese language is ambiguous because there is no equivalent word separator in the Chinese language. This typically causes correction of Chinese text to be difficult when a prior art word-based language correction scheme is employed to correct the Chinese text.

In summary, because a Chinese word is formed by one or a number of characters, it is typically unnatural to apply a word-based language correction scheme to the Chinese language.

SUMMARY OF THE INVENTION

A method of correcting a text in a data processing system is described. One of the features of the method of the present invention is to allow correction of a document to be relatively fast and effective.

Another feature of the method of the present invention is to provide a correction system that allows corrections in a document made by a user to be propagated forward in the document such that the document is corrected by the system in accordance with the portion of the document corrected by the user.

The method in accordance with one embodiment of the invention includes the step of locating a first incorrect character in the text. A character list of alternative characters for the first incorrect character is then shown to the user from which the user chooses a character to replace the first incorrect character with a correct character from the character list. As an alternative to the character list, the user may input a correct character without using a list of characters, such as the character list. The change of the first incorrect character is then propagated through the remainder of the text in accordance with a matching score and a language probability score of the remainder of the text. An apparatus which corrects text in a data processing system is also described.

BRIEF DESCRIPTION OF THE DRAWINGS

The present invention is illustrated by way of example and not limitation in the figures of the accompanying drawings, in which like references indicate similar elements and in which:

FIGS. 4A through 4D show different stages of the process of the character-based correction system of FIGS. 2–3 in correcting an English text;

DETAILED DESCRIPTION

The character-based correction arrangement in accordance with one embodiment of the present invention may be employed in a speech recognition system. However, it shall be appreciated that the correction system of the present invention is not limited to such a system and can apply equally to other pattern recognition systems, such as handwriting recognition systems, or to other user input word processing systems.

Figure 1:
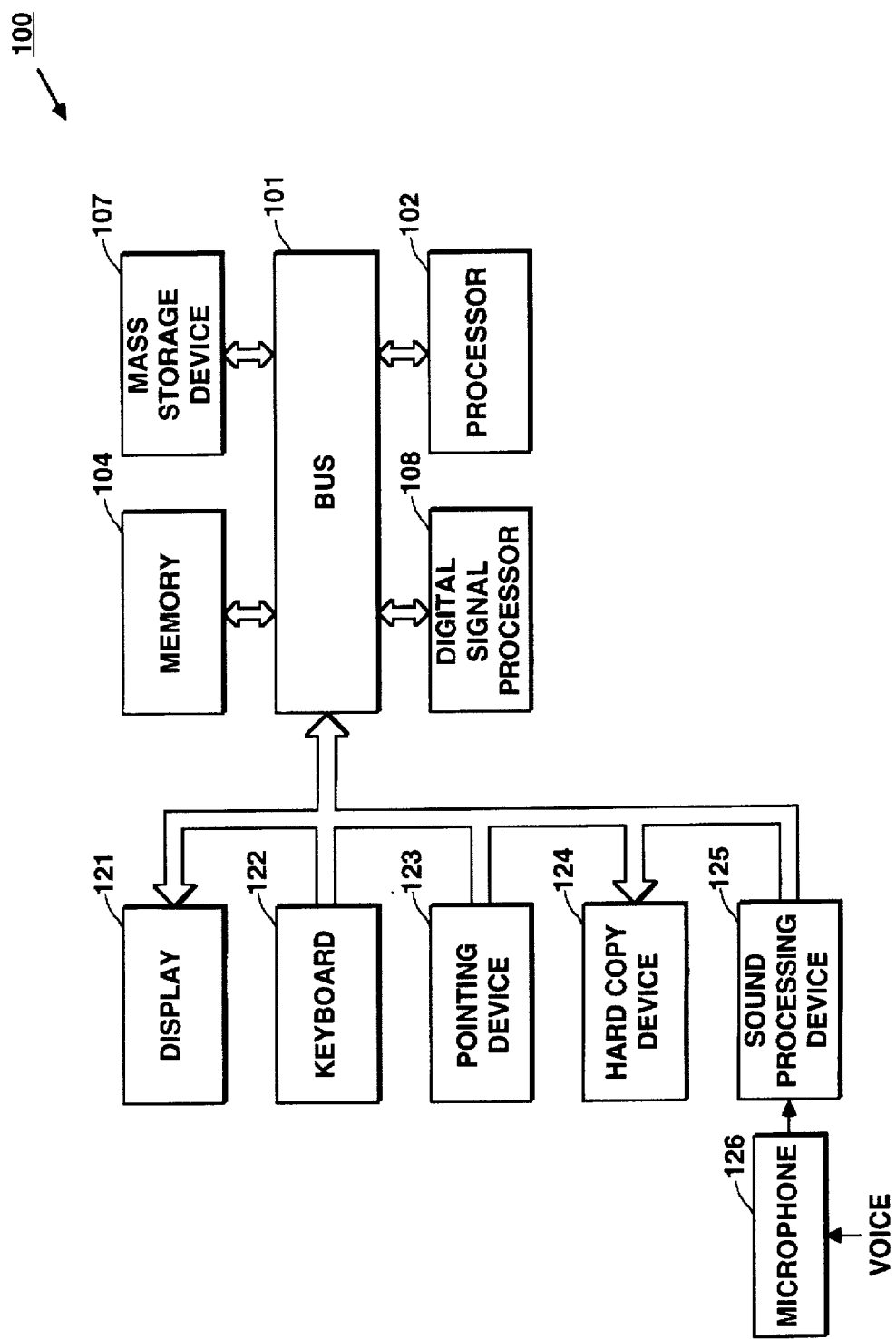
FIG. 1 shows a computer system that includes a speech recognition system.

FIG. 1 illustrates a computer system 100 that implements the speech recognition system on which the correction system of the present invention is implemented. Although FIG. 1 shows some of the basic components of computer system 100, it is neither meant to be limiting nor to exclude other components or combinations of components.

Referring to FIG. 1, computer system 100 includes a bus 101 for transferring data and other information. Computer system 100 also includes a processor 102 coupled to bus 101 for processing data and information. Computer system 100 also includes a memory 104 and a mass storage device 107 coupled to bus 101.

Computer system 100 also includes an optional digital signal processor 108 which performs digital signal processing functions and offers additional processing bandwidth. Alternatively, computer system 100 may not have a digital signal processor. In that case, the digital signal processing functions are performed by processor 102. Computer system 100 may further include a display device 121 coupled to bus 101 for displaying information to a computer user. Keyboard input device 122 is also coupled to bus 101 for communicating information and command selections to processor 102. An additional user input device is a pointing device 123, such as a mouse, a trackball, a trackpad, or cursor direction keys, coupled to bus 101 for communicating direction information and command selections to processor 102, and for controlling cursor movement on display 121. The pointing device 123 typically includes a signal generation device (such as a button or buttons) which provides signals that indicate command selections to processor 102. Another device which may be coupled to bus 101 is a hard copy device 124 which may be used for printing instructions, data, or other information on a medium such as paper, film, or similar types of media. System 100 may further include a sound processing device 125 for digitizing sound signals and transmitting such digitized signals to processor 102 or digital signal processor 108 via bus 101. In this manner, sound may be digitized and then processed using processor 108 or 102. Sound processing device 125 is coupled to an audio transducer, such as microphone 126. Sound processing device 125 typically includes an analog-to-digital (A/D) converter and can be implemented by known sound processing circuits. In addition, microphone 126 can be implemented by any known microphone or sound receiver.

In one embodiment, system 100 is one of the Macintosh® brand family of personal computers available from Apple Computer, Inc. of Cupertino, Calif. Processor 102 is one of the Motorola 680x0 family of processor available from Motorola, Inc. of Schaumburg, Ill., such as the 68020, 68030, or 68040. Alternatively, processor 102 may be a PowerPC RISC processor also sold by Motorola Inc. Processor 108, in one embodiment, comprises one of the AT&T DSP 3210 series of digital signal processors available from American Telephone and Telegraph (AT&T) Microelectronics of Allentown, Pa.

Figure 2:
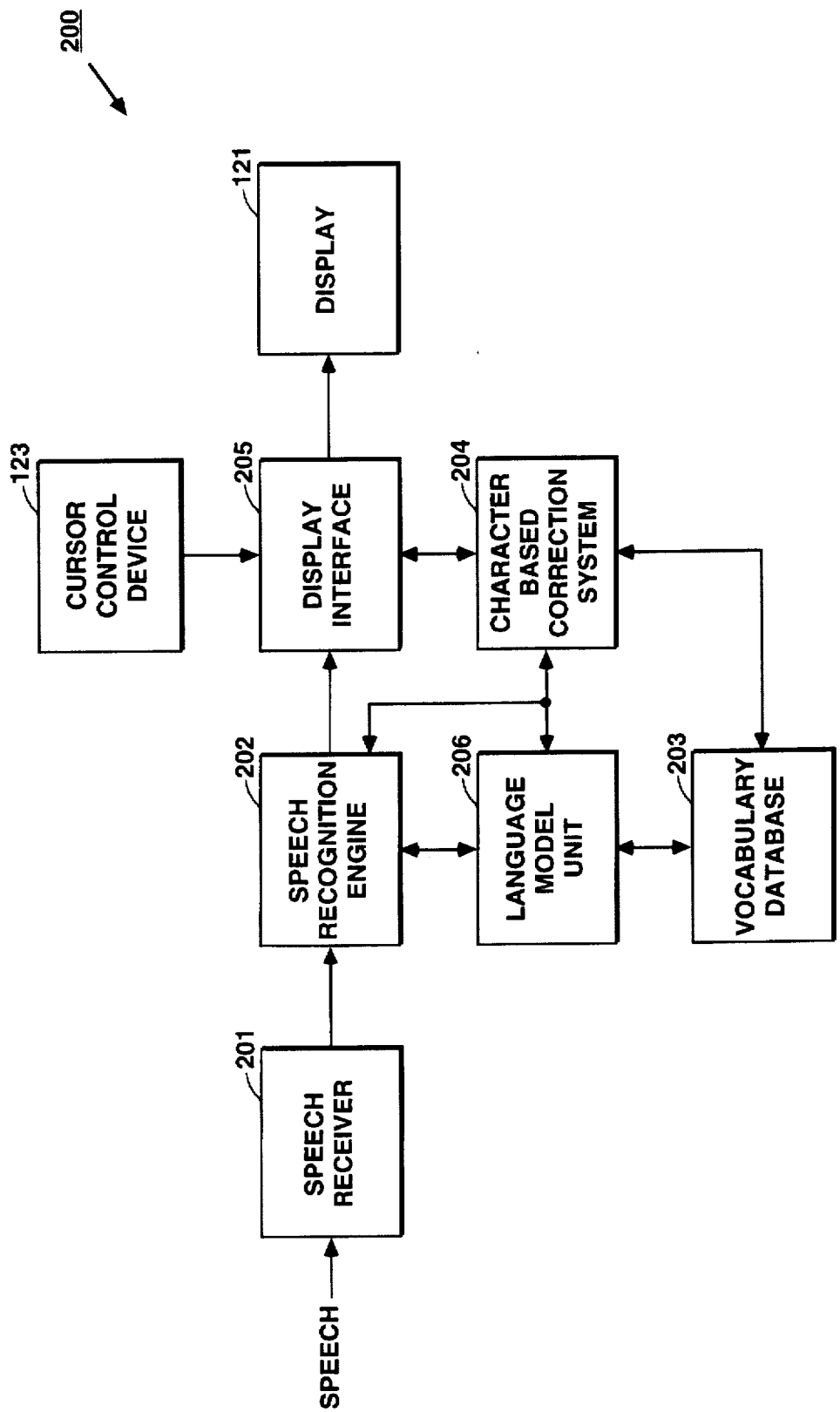
FIG. 2 is a block diagram of the speech recognition system of FIG. 1, wherein the speech recognition system includes a character-based correction system in accordance with one embodiment of the present invention.

Computer system 100 includes a speech recognition system 200 (shown in FIG. 2). Many types of speech recognition systems are known in the art; see, for example, U.S. Pat. No. 5,384,892 and 5,386,494, the contents of which are hereby incorporated by reference. For one embodiment, speech recognition system 200 is implemented as a series of software routines that are run by processor 102, which interacts with data received from digital signal processor 108 via sound processing device 125. It will, however, be appreciated that speech recognition system 200 can also be implemented in discrete hardware or firmware, or in a combination of software and/or hardware. FIG. 2 shows speech recognition system 200 in functional block diagram form.

Referring to FIG. 2, the speech is first fed to a speech receiver 201 of speech recognition system 200. Receiver 201 captures the speech signal and converts the analog speech signal into digital form. Receiver 201 can be implemented by microphone 126 and sound processing device 125 of FIG. 1. The digitized speech signal is then applied to a speech recognition engine 202 for recognition and for supplying the spoken words to a display interface 205 for display. For one embodiment, speech recognition engine 202 is implemented by a series of known speech recognition software routines that are run by processors 102 and 108 of FIG. 1.

In one embodiment, display interface 205 is a user interface system, implemented through software, of computer system 100 of FIG. 1. As can be seen from FIG. 2, display interface 205 interfaces with display 121 and cursor control device 123 of FIG. 1. The user of speech recognition system 200 interacts with recognition system 200 through display interface 205 by means of cursor control device 123 and display 121. This will be described in more detail below.

Speech recognition engine 202 typically includes a speech feature extraction function (not shown). The speech feature extraction function is performed, in one embodiment, by digital signal processor 108 of FIG. 1. The speech feature extraction function of speech recognition engine 202 recognizes acoustic features of human speech, as distinguished from other sound signal information contained in the digitized sound signals from speech receiver 201.

The acoustic features from the speech feature extraction function are input to a recognizer process (also not shown in FIG. 2) of speech recognition engine 202 which performs speech recognition using a language model to determine whether the extracted features represent expected words in a vocabulary database 203 recognizable by speech recognition system 200. In one embodiment, the recognizer uses a recognition algorithm to compare a sequence of frames produced from a speech utterance with a sequence of nodes contained in the acoustic model with each word in vocabulary database 203 to determine if a match exists. The result of the recognition matching process is a text output. In one embodiment, the speech recognition algorithm employed is the Hidden Markov Model (HMM) that is known to a person skilled in the art.

The recognition algorithm of speech recognition engine 202 uses probabilistic matching and dynamic programming for the acoustic matching process. Probabilistic matching determines the likelihood that a given frame of an utterance corresponds to a given node in an acoustic model of a word. This likelihood is not only a function of how closely the amplitude of the individual frequency bands of a frame match the expected frequencies contained in the given node models, but also is a function of how the deviation between the actual and expected amplitudes in each such frequency band compares to the expected deviations for such values.

Dynamic programming, or viterbi searching, provides a method to find an optimal, or near optimal, match between the sequence of frames produced from the utterance and the sequence of nodes contained in the model of the word. This is accomplished by expanding and contracting the duration of each node in the acoustic model of a word to compensate for the natural variations in the duration of speech sounds which occur in different utterances of the same word. A score is computed for each time-aligned match, based on the sum of the dissimilarity between the acoustic information in each frame and the acoustic model of the node against which it is time-aligned. The words with the lowest sum of such distances are then selected as the best scoring words. The combined score of the probability matching and dynamic programming is referred to as acoustic matching score.

In one embodiment and as can be seen from FIG. 2, speech recognition system 200 employs language model filtering (e.g., natural language processing). When language model filtering is used, the total score of a word in a language context for recognition typically includes a language modeling score and the acoustic matching score of that word. Thus, the acoustic matching score of a word needs to be added to the language modeling score of that word before the best scoring word is selected for display so that words which are most probable in the current context can be selected.

The language modeling score of a word is obtained through filtering the language model information for that word. When the language modeling information includes the statistical language model in addition to other language models (e.g., lexicon language model, word pair grammar language model, or syntactic/semantic analysis language model), the language modeling score of a word might include a unigram probability score, and/or a bigram probability score, and/or a trigram probability score, and/or other long distance language probability scores (i.e., N-gram probability scores). The unigram probability score of a word determines the statistical probability of the word regardless of any prior word or words. The bigram probability score of a word determines the statistical probability of the word given a prior adjacent word. The trigram probability score of a word determines the statistical probability of the word given two prior adjacent words. The N-gram probability (long distance language probability score) of a word determines the statistical probability of the word given N prior adjacent words.

The recognition algorithm uses the language model to determine the language modeling score of a speech utterance. The recognition algorithm combines the language modeling score of the speech utterance with the acoustic matching score of the utterance to provide a list (i.e., N-best list) of N possible words arranged in a top-score-down order. The top scored word is then output to display interface 205 for display and the remaining words are contained in the N-best list in the order of their scores.

In one embodiment, the N-best word list contains ten (10) possible words. In another embodiment, the N-best list may contain five (5) possible words. Alternatively, the N-best list can contain an arbitrary number of words. In addition, the length of the N-best list may vary from word to word.

Speech recognition system 200 also includes a character-based correction system 204 that implements one embodiment of the present invention. Correction system 204 is used to correct the text generated by speech recognition engine 202. In other words, correction system 204 is activated to correct the text displayed on display 121. Correction system 204 corrects the text displayed on display 121 through display interface 205. The user of speech recognition system 200 activates correction system 204, in one embodiment via display interface 205 using cursor control device 123 and display 121. Correction system 204 will be described in more detail below, in conjunction with FIGS. 3 through 5D.

In one embodiment, speech recognition system 200 is a non-alphabetic language (e.g., Chinese, Japanese, Korean, etc.) speech recognition system. In this embodiment, correction system 204 is also a non-alphabetic language correction system. In another embodiment, speech recognition system 200 could be an alphabetic language (e.g., English, French, Spanish, etc.) recognition system. In this embodiment, correction system 204 is also an alphabetic language correction system. Correction system 204 will be described in more detail below, in connection with an example of English language (i.e., an alphabetic language) (FIGS. 4A-4D) and an example of Chinese language (i.e., a non-alphabetic language) (FIGS. 5A-5D).

As can be seen from FIG. 2, correction system 204 is a character-based correction system. This means that correction system 204 enables or allows the user to correct incorrect words on a character-by-character basis. When correction system 204 is an alphabetic language correction system, the characters refer to the letters (or alphabets) of the word.

Correction system 204 can be implemented by a software module running on processor 102 of FIG. 1, by a hardware integrated circuit or by a combination of software and hardware. Correction system 204 allows for in-word propagation of the correction of a character throughout the word that contains the character. In addition, correction system 204 allows for between-word propagation of the correction of a word throughout a sentence or text. The in-word propagation and between-word propagation adjusts the N-best list for subsequent characters or words as a consequence of correction by the user, thus allowing automatic correction of many words based on only a single correction by the user.

In addition, the N-best character list in character-based correction system 204 is shorter than the N-best word list in a word-based correction system because different words in the N-best word list might share the same character in the same position. Therefore, the character-based correction may make it easier for users to make choices.

Finally, character-based selections are able to compose much more character combinations than word-based selections. Character-based error correction allows the user to make up a word not appearing in the original word list. This can occur if the user speaks a word that is not in the active vocabulary.

Briefly, the operation of correction system 204 is now described as follows. The user first scans through the text (e.g. sequentially scanning through the text) and finds the first erroneous character (e.g. the left-most erroneous character on a given line of text) By using cursor control device 123, keyboard and/or voice command to point to the character, the user may view an alternative character list (e.g., N-best character list) for the erroneous character that is generated by purging the duplicate characters in the N-best word list for that word. The N-best word list is, however, usually never shown and viewed by the user. The order of such N-best character list is determined by the order of the word from which the character is extracted.

If the correct character appears on the N-best character list and the user selects it to replace the currently displayed character, then an in-word propagation of the correction for the word is performed. If the correct character is not on the list, then the user must correct it using some other input method such as typing or perhaps speech input.

The in-word propagation is performed by rearranging the order of the N-best word list associated with the word in which the changed character appeared. The rearrangement is based on the sum of the acoustic matching score, the unigram probability score, and a language modeling score for each entry. The rearrangement is essentially the same as moving the entries containing the changed character in the corresponding position to the top while maintaining their relative order and maintaining the order of the remaining entries unchanged. Again the N-best word list for that word is not normally shown on the display. Only the top entry of the N-best word list is shown replacing the word displayed, if they are different.

Between-word propagation is then performed after in-word propagation until the first period punctuation appears, or otherwise until the sentence ends. Between-word propagation is also performed by rearranging the N-best word list for each of the words subsequent to the changed word based on the acoustic matching score, the unigram probability score, and the long distance language modeling score, given the changed word. As described above, the long distance language model may include bigram and trigram, etc. Again, the rearranged N-best word list for each of the subsequent words is not normally shown on the display.

As stated earlier, when the user makes a selection to replace/correct a character within a word, the change is propagated forward within the word and towards the end of the sentence or text. After the propagations, however, the user may change the same word by selecting, from the N-best character list generated for a subsequent character, the character which was previously changed within the word in order to change the same word. This then causes another in-word propagation and between-word propagation.

Figure 3:
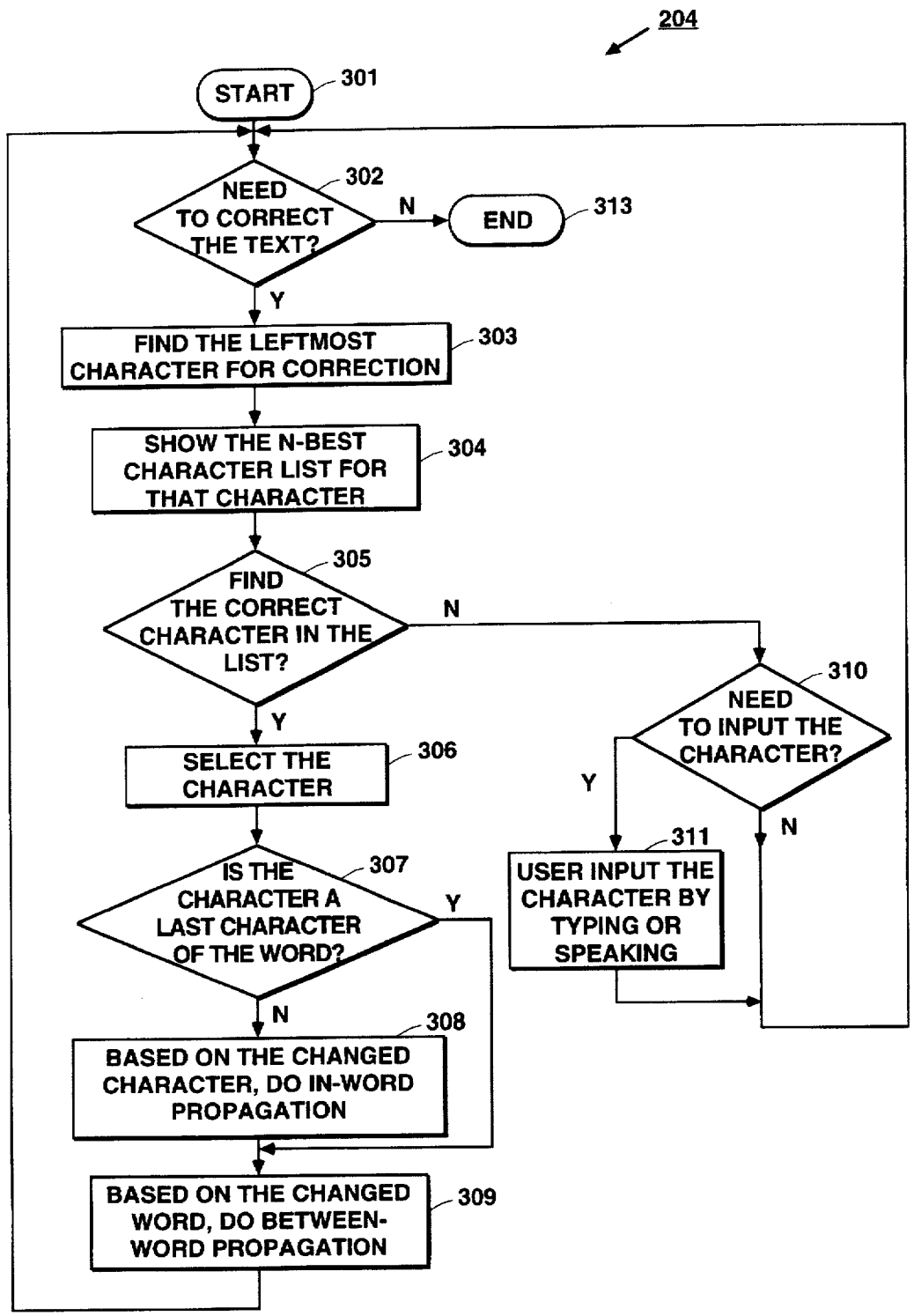
FIG. 3 is a flow chart diagram of the process of the character-based correction system.

Referring to FIG. 3, the process of character-based correction system 204 (FIG. 2) is shown in flow chart diagram. System 204 starts at step 301. The text which has been recognized by the system 200 is displayed as displayed text on display device 121. At step 302, the user decides if correction of the displayed text is needed. As can be seen from FIG. 2, the user of speech recognition system 200 can activate correction system 204 via display interface 205 and cursor control device 123 during speech dictation. The user typically activates correction system 204 using cursor control device 123 to select and activate a character correction menu on display 121 via display interface 205. This causes display interface 205 to generate a signal to call for correction system 204.

The first character of the first word in a sentence that needs to be corrected is located at step 303. In one embodiment, the leftmost character of the leftmost word that needs to be corrected is located by the user. The user typically does this using control cursor device 123 to click on the area of display 121 on the character. At step 304, the N-best character list of that character is obtained and shown. Correction system 204 obtains the N-best character list of that character from speech recognition engine 202. Correction system 204 provides the N-best character list for display on display 121 (FIG. 2) via display interface 205 (FIG. 2). This allows the user to view the N-best character list of that character using cursor control device 123 (FIG. 2). The N-best character list allows the user to select any one of the characters listed in the N-best character list to replace the incorrect character.

At step 305, the user determines if the correct character is in the list. If the correct character is not in the list, then step 310 is performed. At step 310, the user determines if the correct character needs to be input by typing or speaking. If so, step 311 is performed. If not, step 311 is bypassed, leading to step 312.

If, at step 305, it is determined that the correct character is in fact in the list, then step 306 is performed; in this step 306, the character is corrected with the correct character which is selected by the user from the N-best list. This is typically by the user pointing a cursor on the display 121 to the correct character which is also displayed on display 121. Then step 307 is performed to determine if the in-word propagation process of the invention is required. If so, step 308 is performed. If not, step 308 is bypassed.

In step 308, the N-best word list for the word having the corrected character is rearranged in light of the corrected character. In other words, the correction of the character is propagated throughout the word. This is also referred to as in-word propagation and has been described above. This in-word propagation is based on the score of each of the listed words given the corrected character.

Referring back to FIG. 3, correction system 204 then moves to step 309 at which time a between-word propagation is performed to adjust the N-best word list for each of the subsequent words based on the changed word. The between-word propagation is done in accordance with the language modeling score and the acoustic matching score with respect to the corrected word.

As described above, for in-word propagation and between-word propagation, the N-best word list of a word can be automatically adjusted in view of a changed character of the word or in view of a proximately changed word. This causes the correction to be automatic which is more efficient and convenient.

Correction system 204 then returns to step 302 at which the user determines if more correction is needed. If so, step 303 is repeated. If not, the process ends at step 313.

Referring to FIGS. 4A through 4D, the operation of correction system 204 of FIG. 2 is described in accordance with an English text. As can be seen from FIG. 4A, a phrase "VIDEO CONFERENCE" is displayed. In addition, FIG. 4A also shows the correct phrase "AUDIO COEFFICIENT" for the displayed phrase. Moreover, FIG. 4A also shows the N-best word list for each of the words. As described above, the N-best word list for each word is not normally shown on the display. As can be seen from FIG. 4A, the correct word for each displayed word is not high on the N-best list. As described above, the correct word may sometimes not appear on the N-best list.

Figures 4C, 4D:
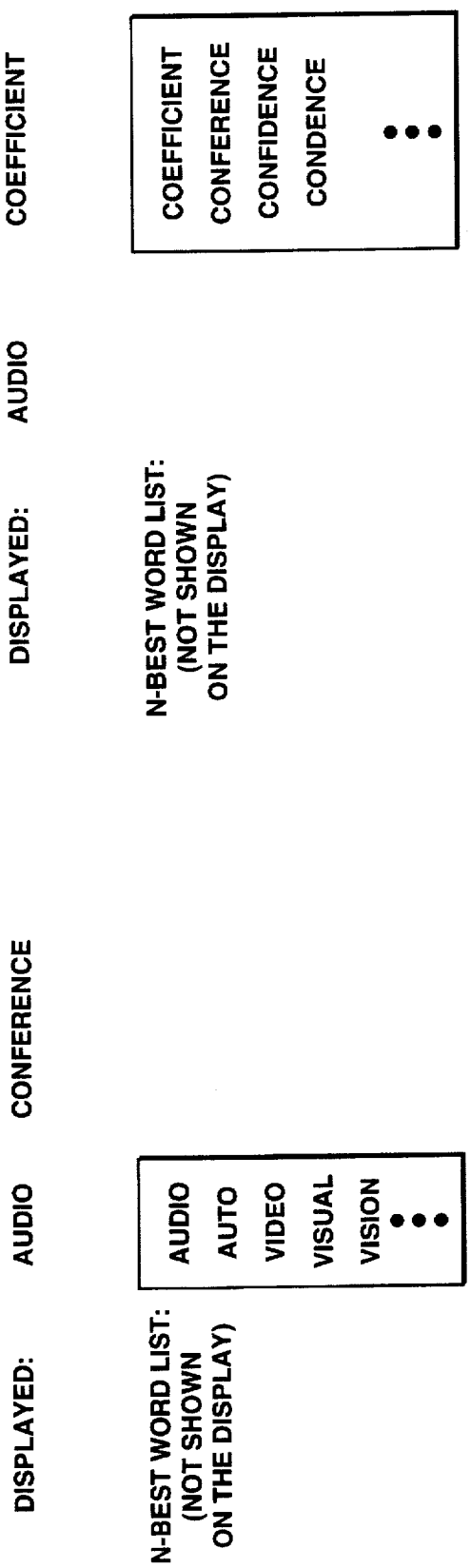

FIG. 4B shows the N-best character list for the first letter of the word "VIDEO" to be corrected. The user then can select the correct letter "A" to replace the letter "V", as can be seen in FIG. 4B. With the first letter of the word "VIDEO" corrected, correction system 204 then propagates the correction throughout the word. As described above, correction system 204 does this by promoting the word "AUDIO" to the top of the N-best word list (see FIG. 4C) and yet maintaining the relative order of the N-best word list by a combination of the acoustic matching score and language model score for each entry to rearrange the words listed in the N-best word list based on the corrected letter "A". This thus causes the words "AUDIO" to appear on top of the N-best list, as shown in FIG. 4C. At this point, the displayed word has also been changed to "AUDIO", as shown in FIG. 4C. Then correction system 204 does the between-word propagation that may cause the word "COEFFICIENT" to appear on top of the N-best list of the word "CONFERENCE". As described above, the between-word propagation is performed in accordance with the bigram language modeling or other long distance language model. This may cause the word "COEFFICIENT" to obtain top bigram probability score with respect to the word "AUDIO" if the bigram probability of "AUDIO" followed by "COEFFICIENT" is big enough to offset the acoustic matching score difference between "CONFERENCE" and "COEFFICIENT". This bigram probability score indicates the likelihood of the word following the word "AUDIO". As can be seen from FIG. 4D, the word "COEFFICIENT" now appears on the top of the N-best list and it is also displayed as a result of this between-word propagation of the error correction.

Figure 5B:
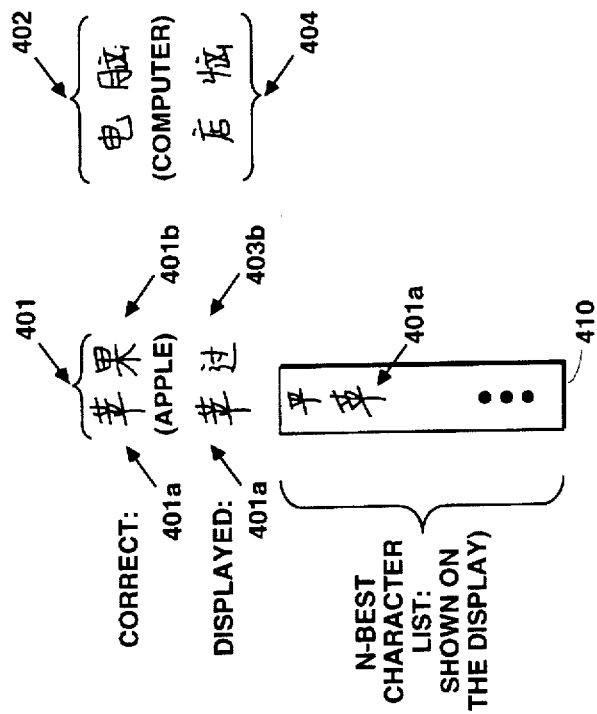
FIGS. 5A through 5D show different stages of the process of the character-based correction system of FIGS. 2–3 in correcting a Chinese text.
Figure 5A:
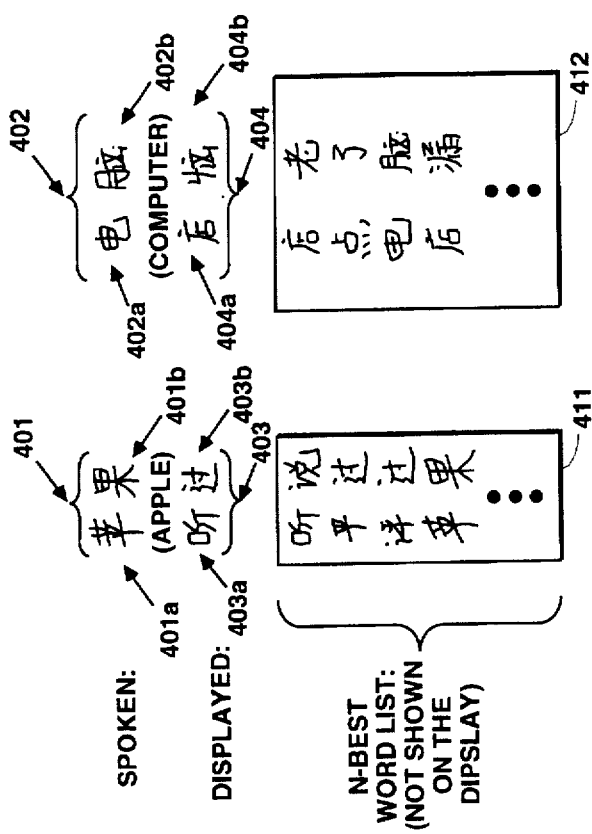
Figure 5D:
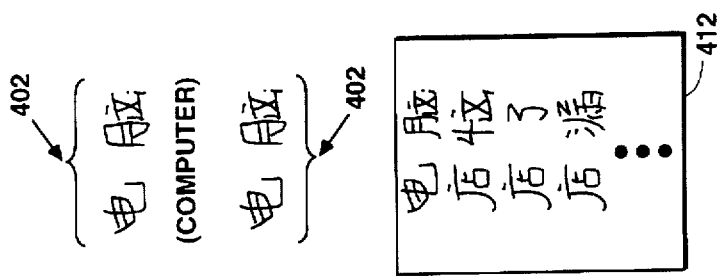
Figure 5D:
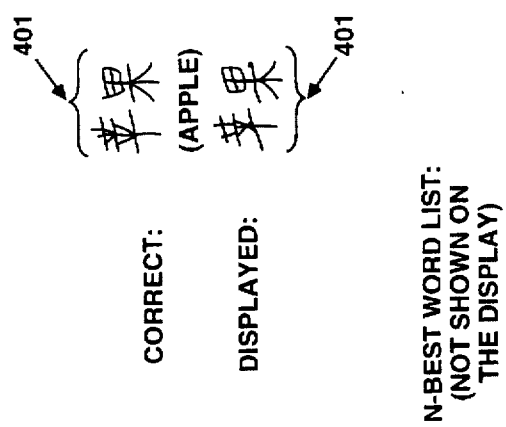
Figure 5C:
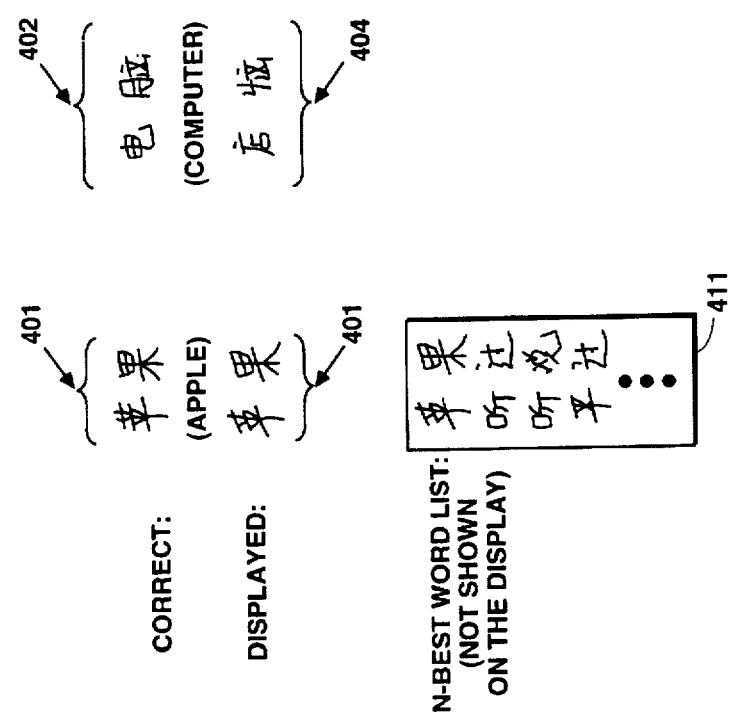

FIGS. 5A through 5D show the operation of correction system 204 of FIG. 2 for text in Chinese. As can be seen from FIG. 5A, the Chinese words 401 and 402 for "Apple Computer" are the correct words, as spoken, whereas the actual displayed words 403 and 404 are different. As also can be seen from FIG. 5A, the Chinese word 401 for "Apple" includes two Chinese characters 401a and 401b and the Chinese word 402 for "Computer" includes two characters 402a and 402b. FIG. 5B shows an N-best character list 410 of the first character 403a of the first word 403 displayed. The first character 403a is then replaced by character 401a from the N-best character list 410, as can be seen from FIG. 5B. This then causes the Chinese word for "Apple" to move to the top of the N-best word list 411 of the Chinese word 403, as seen in FIG. 5C and appear on the display device. Then the correction is propagated to the second word where its N-best word list 412 changes its word order by listing the Chinese word 402 "Computer" first (FIG. 5D) and in turn the Chinese word 402 for "computer" is displayed as a result of this between-word propagation of the error.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of correcting a text in a data processing system, comprising the steps of:
    (A) recognizing an input pattern using a pattern recognition system and locating a first incorrect character which is a portion of a word in the text;
    (B) showing to the user a character list of alternative characters for the first incorrect character and allowing the user to select a correct character which is a portion of a word to replace the first incorrect character from the character list, each of said alternative characters being a portion of a word;

(C) propagating a change of the first incorrect character through a remainder of the text in accordance with a matching score and a language probability score of the remainder of the text with respect to the correct character to correct any subsequent incorrect character in the text.

2. The method of claim 1, wherein the step (C) further comprises the steps of (I) determining if the first incorrect character is a last character of a word of the text;

(II) if the first incorrect character is not the last character of the word, then performing an in-word propagation of the change of the first incorrect character through at least one remaining character of the word in accordance with the matching score and an unigram probability score of the remaining character, and in accordance with a bigram probability score of the remaining character with respect to the correct character.

3. The method of claim 2, wherein the step (C) further comprises the steps of (III) performing a between-word propagation of the change of the word through the text to change the adjacent word of the word in accordance with the matching score and the unigram probability score of the adjacent word, and a long distance language probability score of the adjacent word with respect to the corrected word.

4. The method of claim 3, wherein the long distance language probability score includes a bigram probability score and a trigram probability score, wherein the matching score includes an acoustic matching score.

5. The method of claim 4, wherein the step (C) further comprises the steps of (IV) determining if the adjacent word is a last word of the text;

(V) if the adjacent word is the last word of the text, then stopping the between-word propagation;

(VI) if the adjacent word is not the last word of the text, then repeating the steps (III) and (IV).

6. The method of claim 1, wherein the text is a Chinese text that includes a number of words, each being formed by at least one Chinese character.

7. The method of claim 1, wherein the text is an English text that includes a number of words, each being formed by at least one English character/letter.

8. The method of claim 1, wherein the data processing system is a computer system having a text processing user interface.

9. A method of correcting a text in a data processing system, comprising the steps of:

(A) recognizing an input pattern using a pattern recognition system and locating a first erroneous word of the text that needs to be corrected;

(B) changing a first erroneous character of the first erroneous word with a correct character which is a portion of a word from a character list of alternative characters for the first erroneous character, each of said alternative characters being a portion of a word;

(C) propagating a change of the first erroneous character through the first erroneous word by rearranging a word list of alternative words of the first erroneous word in accordance with the correct character such that a correct word can appear high on the word list to replace the first erroneous word.

10. The method of claim 9, wherein the word list of the first erroneous word initially lists the alternative words of the first erroneous word in accordance with a matching score and a language model probability score with respect to the first erroneous word, wherein the step (C) further comprises the steps of (a) re-calculating the language model probability score for each of the alternative words of the word list in accordance with the correct character in order to promote the correct word of the first erroneous word from the word list, wherein the language model probability score includes at least one of a unigram probability score and a bigram probability score;

(b) moving the words that contain the correct character in corresponding position and in accordance with the re-calculated language model probability score of each of those words to top of the word list without rearranging remaining alternative words in the word list.

11. The method of claim 10, further comprising the step of (D) propagating change of the first erroneous word through the text by rearranging the word list of alternative words for each of subsequent words of the first erroneous word in accordance with the correct word of the first erroneous word such that the correct word for each of the subsequent words of the text that need to be corrected can appear high on the respective word list.

12. The method of claim 9, wherein the data processing system is a computer system having a text processing user interface.

13. The method of claim 12, wherein the text is a Chinese text that includes a number of words, each being formed by at least one Chinese character.

14. The method of claim 12, wherein the text is a English text that includes a number of words, each being formed by at least one English character/letter.

15. A method of correcting a text in a data processing system, comprising the steps of:

(A) recognizing an input pattern using a pattern recognition system and locating a first erroneous word of the text that needs to be corrected;

(B) changing the first erroneous word with a correct character which is a portion of a word;

(C) propagating a change of the first erroneous word through the text by rearranging a word list of alternative words for an adjacent erroneous word which is proximate to the first erroneous word in accordance with the correct character such that a correct word for the adjacent erroneous word can appear high on the word list of the adjacent erroneous word.

16. The method of claim 15, wherein the step (C) further comprises the steps of (I) re-calculating the language model probability score for each of the alternative words of the word list of the adjacent erroneous word in accordance with a unigram probability score of the correct character with respect to the adjacent erroneous word and a long distance language probability score of the correct word of the adjacent erroneous word with respect to a correct word of the first erroneous word.

17. The method of claim 16, wherein the long distance language probability score includes at least one of a bigram probability score and a trigram probability score.

18. The method of claim 17, wherein the step (C) further comprises the steps of
   - (III) determining if the adjacent erroneous word is a last word of a sentence;
   - (IV) if the adjacent erroneous word is not the last word of the sentence, then making the adjacent erroneous word as the first erroneous word and repeating the steps of (C)(I) and (C)(II).

19. The method of claim 15, wherein the data processing system is a computer system having a text processing user interface.

20. The method of claim 19, wherein the text is a Chinese text that includes a number of words, each being formed by at least one Chinese character.

21. The method of claim 19, wherein the text is a English text that includes a number of words, each being formed by at least one English character/letter.

22. A method of correcting a text in a data processing system, comprising the steps of:
   - (A) recognizing an input pattern using a pattern recognition system and locating a first incorrect character which is a portion of a word in the text;
   - (B) allowing the user to input a correct character which is a portion of a word to replace the first incorrect character;
   - (C) propagating a change of the first incorrect character through a remainder of the text in accordance with a score of the remainder of the text with respect to the correct character to correct any subsequent incorrect character in the text wherein said score is one of a matching score based upon a viterbi search or a language probability score.

23. A method as in claim 1 wherein the text is a single word.

24. A method as in claim 1 wherein the text comprises a plurality of words.

25. A method as in claim 22 wherein the text is a single word.

26. A method as in claim 22 wherein the text comprises a plurality of words.

27. A method of correcting a text in a data processing system, comprising the steps of:
   - (A) locating a first incorrect character which is a portion of a word in the text;
   - (B) showing to the user a character list of alternative characters for the first incorrect character and allowing the user to select a correct character which is a portion of a word to replace the first incorrect character from the character list, each of said alternative characters being a portion of a word;
   - (C) propagating a change of the first incorrect character through a remainder of the text in accordance with a matching score and a language probability score of the remainder of the text with respect to the correct character to correct any subsequent incorrect character in the text.

* * * * *

UNITED STATES PATENT AND TRADEMARK OFFICE
CERTIFICATE OF CORRECTION

PATENT NO. : 5,761,687
DATED : June 2, 1998
INVENTOR(S) : Hon, et al.

It is certified that error appears in the above-identified patent and that said Letters Patent is hereby corrected as shown below:

On the title page at [22] please delete "Oct. 5, 1995" and insert --Oct. 4, 1995--

Signed and Sealed this

Twenty-first Day of December, 1999

Attest:

Q. TODD DICKINSON

*Attesting Officer*   *Acting Commissioner of Patents and Trademarks*